(12) United States Patent
Pouteau et al.

(10) Patent No.: US 11,371,193 B2
(45) Date of Patent: Jun. 28, 2022

(54) METHOD FOR MANUFACTURING A ROAD PAVEMENT COMPRISING A HEAT EXCHANGER DEVICE

(71) Applicant: EUROVIA, Rueil Malmaison (FR)

(72) Inventors: Bertrand Pouteau, Saint Medard en Jalles (FR); Kamal Berrada, Le Pian Medoc (FR); Sandrine Vergne, Talence (FR)

(73) Assignee: EUROVIA, Rueil Malmaison (FR)

( * ) Notice: Subject to any disclaimer, the term of this patent is extended or adjusted under 35 U.S.C. 154(b) by 395 days.

(21) Appl. No.: 16/620,228

(22) PCT Filed: Jun. 7, 2018

(86) PCT No.: PCT/FR2018/051317
§ 371 (c)(1),
(2) Date: Dec. 6, 2019

(87) PCT Pub. No.: WO2018/224781
PCT Pub. Date: Dec. 13, 2018

(65) Prior Publication Data
US 2020/0141068 A1    May 7, 2020

(30) Foreign Application Priority Data

Jun. 7, 2017   (FR) ...................................... 1755039

(51) Int. Cl.
*E01C 11/20*   (2006.01)
*E01C 11/26*   (2006.01)
*C08L 95/00*   (2006.01)

(52) U.S. Cl.
CPC ............ *E01C 11/26* (2013.01); *C08L 95/005* (2013.01); *C08L 2555/86* (2013.01)

(58) Field of Classification Search
CPC ..... E01C 11/26; C08L 95/005; C08L 2555/86
(Continued)

(56) References Cited

U.S. PATENT DOCUMENTS 3,995,965 A * 12/1976 Cox ........................ E01D 19/00
                                                          404/71
4,026,350 A *  5/1977 Zembrzuski ............ E01C 11/26
                                                         126/271.1
(Continued)

FOREIGN PATENT DOCUMENTS

DE    202004006198 U1    1/2005
EP         0690102 A1    1/1996
(Continued)

OTHER PUBLICATIONS

Bardesi et al., "Emploi des Liants Bitumineux Modifiés, des Bitumes Spéciaux et des Bitumes avec Additifs en Techniques Routières," Association mondiale de la Route (AIPCR), Comité Technique des Routes Souples (C8), No. 303, Jul. 1999, pp. 9-14, with English translation.

(Continued)

*Primary Examiner* — Raymond W Addie
(74) *Attorney, Agent, or Firm* — Birch, Stewart, Kolasch & Birch, LLP

(57) ABSTRACT

The invention relates to a method for manufacturing a road pavement comprising pipes of a device for a heat exchanger, comprising the following steps:
  a) digging a course to create grooves extending in a same direction and strips connecting the grooves, then
  b) laying the pipe having a crushing strength higher than 2 000N per linear metre of pipe at 100° C. into the grooves created in step a); and then
  c) filling the empty space left free by the pipe in the grooves with an asphalt mix having a working temperature lower than 160° C., based on:
  a hydrocarbon binder,
  at least 90% by weight, with respect to the total weight of the asphalt mix, of an aggregate fraction the elements of which have dimensions less than 10 mm, (Continued)

and comprising from 30% to 60% by weight, with respect to the total weight of the aggregate fraction, of sand, d) applying a surface course for a road pavement.

20 Claims, 2 Drawing Sheets

(58) Field of Classification Search
USPC .................................................. 404/71–75
See application file for complete search history.

(56) References Cited

U.S. PATENT DOCUMENTS

| | | | | |
|---|---|---|---|---|
| 4,305,681 | A * | 12/1981 | Backlund | F24S 20/64 |
| | | | | 165/47 |
| 4,693,300 | A * | 9/1987 | Adachi | E01C 11/26 |
| | | | | 165/45 |
| 5,024,553 | A * | 6/1991 | Katsuragi | E01C 11/26 |
| | | | | 165/45 |
| 5,308,187 | A * | 5/1994 | Nix | E01C 11/26 |
| | | | | 404/22 |
| 5,395,179 | A * | 3/1995 | Kotani | E01C 11/26 |
| | | | | 219/544 |
| 6,156,113 | A | 12/2000 | Pasquier | |
| 6,588,974 | B2 | 7/2003 | Hildebrand et al. | |
| 2004/0033308 | A1 | 2/2004 | Barthel et al. | |
| 2004/0062606 | A1 * | 4/2004 | Zaleski | E01C 11/265 |
| | | | | 404/71 |
| 2006/0230981 | A1 | 10/2006 | Dean | |
| 2006/0250886 | A1 | 11/2006 | Dupuis et al. | |
| 2008/0146477 | A1 | 6/2008 | Mentink et al. | |
| 2008/0250975 | A1 | 10/2008 | Deneuvillers et al. | |
| 2009/0088499 | A1 | 4/2009 | Barreto et al. | |
| 2009/0137705 | A1 | 5/2009 | Faucon Dumont et al. | |
| 2010/0154216 | A1 | 6/2010 | Hulen | |
| 2013/0068135 | A1 | 3/2013 | Delfosse et al. | |
| 2015/0034067 | A1 * | 2/2015 | Szekely | E01C 11/265 |
| | | | | 126/271.1 |

FOREIGN PATENT DOCUMENTS

| | | |
|---|---|---|
| EP | 0900822 A1 | 3/1999 |
| EP | 2062941 A | 5/2009 |
| EP | 2062943 A1 | 5/2009 |
| FR | 1.191.666 A | 10/1959 |
| FR | 1.269.116 A | 8/1961 |
| FR | 2721043 A1 | 12/1995 |
| FR | 2852018 A1 | 9/2004 |
| FR | 2855523 A1 | 12/2004 |
| FR | 2883882 A1 | 10/2006 |
| FR | 2891838 A1 | 4/2007 |
| FR | 2901279 A1 | 11/2007 |
| FR | 2910477 A1 | 6/2008 |
| FR | 2939143 A1 | 6/2010 |
| FR | 2945818 A1 | 11/2010 |
| FR | 2950893 A1 | 4/2011 |
| FR | 2965271 A1 | 3/2012 |
| FR | 3054568 A1 | 2/2018 |
| WO | WO 99/11737 A1 | 3/1999 |
| WO | WO 99/34155 A1 | 7/1999 |
| WO | WO 2004/016565 A2 | 2/2004 |
| WO | WO 2005/081775 A2 | 9/2005 |
| WO | WO 2006/070104 A1 | 7/2006 |
| WO | WO 2006/119354 A1 | 11/2006 |
| WO | WO 2007/112335 A2 | 10/2007 |
| WO | WO 2007/143016 A2 | 12/2007 |
| WO | WO 2011/151387 A1 | 12/2011 |
| WO | WO 2011/153267 A1 | 12/2011 |
| WO | WO 2015/091890 A1 | 6/2015 |

OTHER PUBLICATIONS

French Search Report and Written Opinion for French Application No. 1755039, dated Jan. 26, 2018.

International Search Report and Written Opinion of the International Searching Authority (Form PCT/ISA/220, PCT/ISA/210 and PCT/ISA/237) for International Application No. PCT/FR2018/051317, dated Aug. 10, 2018.

* cited by examiner

METHOD FOR MANUFACTURING A ROAD PAVEMENT COMPRISING A HEAT EXCHANGER DEVICE

The invention relates to a method for manufacturing a road pavement comprising, advantageously at the surface, a device for heat exchanger aiming at recovering heat energy from roadways or returning heat energy to the roadway. This method can be implemented upon manufacturing a new road or upon renovating an existing road.

There are about 32 million kilometres of paved roads throughout the world. The roadways are more or less planar surfaces, generally of a dark colour, which makes them interesting for this invention: their thermal properties make them capable of storing significant amounts of heat energy in the daytime, thanks to the sunshine received. In a world context of developing renewable energies, it seems quite judicious to try to recover this free energy collected by roadways.

Among the different materials used for building roadways, in particular mastic asphalt, bituminous mixes, concrete, macadam or sand, bituminous bituminous mixes are one of the materials the temperature of which rises the most in the daytime because of their lesser reflectance and their moderate thermal conductivity.

The use of the roadways as thermal collectors are already known for multiple uses: cooling the roadways to avoid a permanent deformation likely to occur in summer, recovering stored heat to bring energy to adjacent buildings.

The use of geothermal is also known to warm the roadway, in particular to remove snow from roads in winter (heating roadways).

Patent DE 20 2004 006 198 describes a system for recovering heat energy from roadways in which the pipes are installed under the road. This system requires a road protecting course which impacts the energy performance. Indeed, the pipes are far from the wearing course, which makes up the thermal collector.

Patent application WO99/34155 describes a system for recovering heat energy from roadways in which pipes are integrated in hot porous bituminous mixes (110-160° C.). This application teaches that the bituminous mixes have to be porous, even very porous, to allow the integration of the pipes. An adhesive course is provided to fill the empty spaces between the pipes and the porous bituminous mixes. The pipes have to be cooled, by circulating a pressurised cooling agent, during integration and the jobsite machine workflow phases. Cooling and pressurising the pipes enable them to be thermally and mechanically protected and mainly thermal shrinkage to be avoided upon laying the pipes into a still hot asphalt mix. Further, the angle of the pipes with the axis of the compactor rollers should also be controlled.

According to this method, expensive particular means must be implemented during the subsequent workflow of the crawler tracks of the finishers or other jobsite machines.

The invention aims at a simple method enabling at least one pipe for a heat exchanger to be integrated in an existing roadway, either being manufactured, or being renovated.

The invention aims at industrialising the implementation of the exchanger in the roadways in order:
 to allow a high-rate implementation;
 to ensure integrity of the pipes and the roadway under any traffic;
 to be quickly circulable after implementation;
 to target a 100% recyclability.

Advantageously, the presence of the device for a heat exchanger does not impact the road performance of the roadway.

The invention provides the integration of the pipe in an existing asphalt mix by creating in the asphalt mix of the coating reserves for the pipe and then the space is filled with a particular asphalt mix and a surface course is applied.

DESCRIPTION OF THE FIGURES

FIG. 3A: U-shape,
FIG. 3B: V-shape,
FIG. 3C: dovetail shape,
FIG. 3D: square shape.

In these figures, the pipe that will be positioned in the groove has not been represented.

"w" designates the width of each groove.

Figure 4:
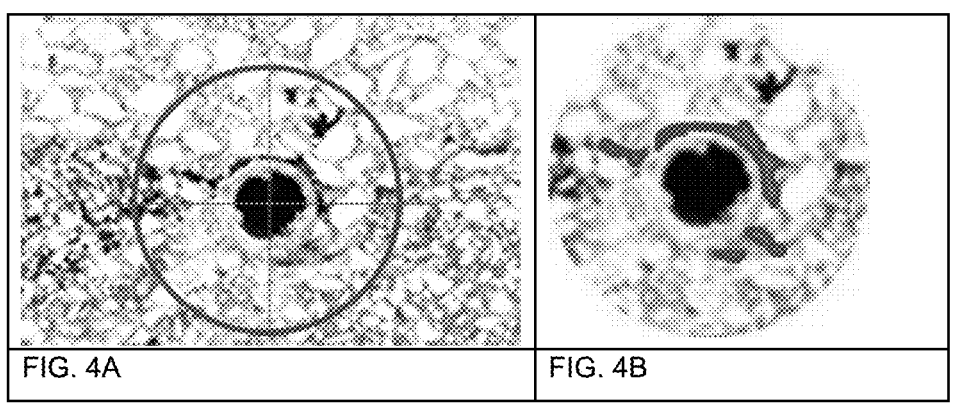

In FIG. 4, the percolation analysis by image analysis is shown:
 FIG. 4A: selection of the zone to be analysed: 3d.
 FIG. 4B: visual detection of non-percolated zones.

DETAILED DESCRIPTION OF THE INVENTION

One object of the invention is a method for manufacturing a road pavement 2 comprising at least one pipe 3 of a device for a heat exchanger, comprising the following steps of:
 a) digging a course 6 of the road pavement to create grooves 1 extending in a same direction without crossing each other, and strips 2 connecting the grooves 1 two by two, the grooves 1 having a width ranging from 0.8d to 2d and a depth ranging from 0.8d to 3d, d being the diameter of the pipes 3 of the device for heat exchanger; and then
 b) laying the pipe 3 into the grooves 1 and the strips 2 created in step a) by forming sections connected by bends, the grooves 1 receiving the sections and the strips 2 receiving the bends, the pipe 3 having a crushing strength higher than 3 000N per linear metre of pipe at 100° C.; and then
 c) filling the empty space left free by the pipe 3 into the grooves 1 with an asphalt mix 4 based on:
 a hydrocarbon binder,
 at least 90% by weight, with respect to the total weight of the asphalt mix, of a granular fraction, the elements of which have dimensions between 0 mm and 10 mm, said granular fraction comprising from 30% to 60% by weight, with respect to the total weight of the granular fraction, of elements having dimensions between 0 mm and 2 mm,
 said asphalt mix 4 having a working temperature lower than 160° C.,
 d) applying a surface course for a road pavement, in particular a wearing course 5.

By "working temperature", it is meant, for the purposes of the present invention, the temperature at which the asphalt mix is applied on jobsite.

Advantageous characteristics of the invention will be described in the following. These characteristics can be combined with each other.

Device for a Heat Exchanger:

The device for a heat exchanger comprises at least one pipe 3, in particular pipes 3, in which at least one coolant will be able to circulate.

The pipes 3 are advantageously made of polymer. Indeed, it is desired that the presence of the device in the road pavement does not impact the recyclability thereof. The polymer is chosen as a function of the application temperature for the asphalt mix 4 and the specific heat capacity provided by this asphalt mix 4. A polymer having a melting or softening or glass transition temperature higher than the application temperature for the asphalt mix 4 is chosen.

By way of example of suitable polymer, high-density polyethylene, cross linked high-density polyethylene, polypropylene, polybutene, ethylene-propylene block copolymers can be mentioned.

An important characteristic of these pipes 3 is their crushing strength.

Indeed, the pipes 3 will be subjected to the weight of the asphalt mix 4 for filling and passing the compactor.

The crushing strength is the force obtained when the pipe 3 is crushed in such a way that its external diameter is divided by two with respect to its initial diameter.

The pipes 3 have a crushing strength higher than 2 000N per linear meter of pipe at 100° C., advantageously higher than 3 000N, more advantageously higher than 4 000N.

In particular, the pipes 3 have a crushing strength between 2 000N and 100 000N, advantageously between 3 000N and 100 000N, more advantageously between 4 000N and 100 000N, per linear meter of pipe at 100° C.

For a same polymer, the rigidity of the pipes 3, and thus the crushing strength, could be increased by increasing the skin thickness of the pipes 3.

Another advantageous characteristic of these pipes 3 is their thermal expansion.

The thermal expansion of the pipes 3 is advantageously lower than $200 \cdot 10^{-6} K^{-1}$ at 20° C., more advantageously lower than $160 \cdot 10^{-6} K^{-1}$ at 20° C. The thermal expansion of the pipes 3 is generally higher than $10 \cdot 10^{-6} K^{-1}$ at 20° C.

The pipes 3 are subjected to heat upon applying the filling asphalt mix 4, when the same is not a cold cast bituminous material (CCBM). The heat provided depends on the working temperature of the asphalt mix 4 and also on the thickness of the asphalt mix 4 (specific heat capacity) and thus on the exposure time to a temperature higher than the ambient temperature.

Advantageously, the hot shrinkage of the pipes 3, measured according to the NF EN ISO 2505 standard, of 2005, is lower than 3% (in stove, at 150° C. for 60 mn), more advantageously lower than 2%.

The pipes 3 of the device have advantageously a diameter ranging from 5 mm to 30 mm. The pipes 3 of the device have advantageously a skin thickness ranging from 1 mm to 5 mm.

In use, a coolant circulates in the pipes 3 of the device for a heat exchanger. The coolant can be water or glycolated water to decrease the freezing point and the cold resistance. A safe glycolated water of the mono-propylene glycol kind is preferred, as recommended by the NF X10-970 standard of January 2011.

Additives, in particular fungicidal and bactericidal additives, could be added to the coolant.

Asphalt Mix 4

An asphalt mix is an aggregate covered with a hydrocarbon binder, used in road pavement. It is obtained by mixing a granular fraction and a hydrocarbon binder.

It has been noticed that, unlike other filling materials, the asphalt mix 4 enables a proper contact between the pipes 3 and the hardened composition to be ensured while ensuring that the pipes 3 do not rise to the surface. This could be checked by implementing the percolation analysis method by image analysis and the "Flotation" test method described as an introduction of the examples.

Granular Fraction:

By "granular fractions", it is meant here any solid mineral fractions usable for making road products, based on a hydrocarbon binder comprising in particular natural mineral granulates (gravels, sand, fines) from mine or gravel pits, recycling products such as asphalt mixes aggregates resulting from recycling recovered materials upon road repairing as well as surplus from coating sites, production scrap, granulates from recycling road materials including concretes, slags in particular cinders, shales in particular bauxite or corundum, rubber crumbs from tyre recycling in particular, artificial granulates from any origin and for example from clinkers from municipal solid waste incineration (MIDN), as well as their mixtures in any proportions.

Within the scope of the invention, the granular fraction advantageously comprises:
  elements lower than 0.063 mm (filler or fines)
  sand the elements of which are between 0.063 mm and 2 mm;
  elements, in particular gravels, having dimensions
    between 2 mm and 6 mm;
    possibly, between 6 mm and 10 mm.

The size of the mineral granulates is measured by the tests described in the NF EN 933-2 standard (May 1996 version).

By "mineral fines" or "filler", it is meant any mineral or siliceous filler, passing through a square hole sieve with a 0.063 mm side. The fines can be natural or extra fines, for example limestone fines (calcium carbonate), cement or hydrated lime, or recovery fines.

By "asphalt mixes aggregates", it is meant asphalt mixes (mixture of granulates and hydrocarbon binders, advantageously bituminous binders) from grinding of asphalt mixes courses, from milling of plates extracted from asphalt mixes roadways, bits of asphalt mixes plates, asphalt mixes waste or surpluses of asphalt mixes productions (the surpluses of productions are partially asphalt mixes in jobsite resulting from transitory production phases).

In the granular fraction, the content of fines (elements lower than 0.063 mm) advantageously ranges from 5% to 10% by weight, with respect to the total mass of the granular fraction, more advantageously from 6% to 9% by weight.

In the granular fraction, the content of elements having a size higher than 0.063 mm and lower than or equal to 2 mm, in particular sand, advantageously ranges from 15% to 60% by weight, with respect to the total mass of the granular fraction, more advantageously from 20% to 50% by weight, more advantageously from 24% to 38% by weight.

In the granular fraction, the content of elements having a size higher than 2 mm ranges from 30% to 80% by weight, with respect to the total mass of the granular fraction, more advantageously from 35% to 70% by weight, more advantageously from 40% to 65% by weight.

In particular, the granular fraction of the asphalt mix 4 advantageously comprises:
  from 6% to 9% by weight, with respect to the total weight of the granular fraction, of fines, having a size lower than 0.063 mm;

from 24% to 38% by weight, with respect to the total weight of the granular fraction, of sand, having a size between 0.063 mm and 2 mm;

from 40% to 65% by weight, with respect to the total weight of the granular fraction, of granulates, having a size between 2 mm and 10 mm.

The thermal conductivity of the asphalt mix 4 is in particular adjusted by the type of granulates. The thermal conductivity, λ, of the composition 4 is advantageously higher than or equal to 1 W/m·K, more advantageously higher than or equal to 1.2 W/m·K, further more advantageously higher than or equal to 1.5 W/m·K.

Hydrocarbon Binder:

The binder is what enables granulates to be bonded to each other and to ensure a proper mechanical strength for the roadway.

The binder of the asphalt mix 4 is a hydrocarbon binder which can be a bituminous or plant-based or synthetic binder. The binder can also be a mixture of binders from these different origins.

By "hydrocarbon binder", it is meant a hydrocarbon binder, advantageously of fossil origin, or any binder of plant or synthetic origin, usable for making a road product, in particular a hydrocarbon product. Advantageously, it is any composition containing bitumen, possibly a workability additive and possibly one or more additives and/or one or more emulsifiers and/or one or more viscosifiers and/or one or more fluxes and/or one or more plastifiers and/or any other additive enabling the properties thereof to be adjusted, such as for example adhesivity. By way of example, bitumens, bitumens modified by elastomers and/or plastomers will be mentioned.

This hydrocarbon binder can be in liquid form or in the form of an emulsion or of foam.

Advantageously, the binder is of the 35/50 grade.

In an advantageous alternative of the invention, road binders in accordance with NF EN 12591 (2009, pure bitumens) or NF EN 13924 (2006, hard bitumens) or NF EN 14023 (2010, polymeric modified bitumen) standards will be used.

Advantageously, the binder also comprises a polymer.

The "polymer" modifying the binder to which it is referred herein can be chosen from natural or synthetic polymers. It is for example a polymer from the synthetic or natural elastomer family, and in an indicative and non-limiting way:

random, multi-block or star copolymers, of styrene and butadiene or isoprene in any proportions (in particular block copolymers of styrene-butadiene-styrene (SBS), styrene-butadiene (SB, SBR for styrene-butadiene rubber), styrene-isoprene-styrene (SIS)) or copolymers of a same chemical family (isoprene, natural rubber, . . . ), possibly cross-linked in-situ, in particular random, multi-block or star copolymers, of styrene and butadiene or isoprene in any proportions, copolymers of vinyl acetate and ethylene in any proportions, copolymers of ethylene and esters of acrylic, methacrylic acid or maleic anhydride, copolymers and terpolymers of ethylene and glycidyl-methacrylate) and polyolefines, in particular polyethylene.

The polymer is advantageously chosen from random, multi-block or star copolymers, of styrene and butadiene or isoprene, copolymers of vinyl acetate and ethylene, and polyethylene.

The polymer modifying the bitumen can be chosen from recovery polymers, for example "rubber crumbs" or any other compositions based on rubber reduced to bits or powder, for example from used tyres or other waste based on polymers (cables, packages, agricultural, . . . ) or even any other polymer commonly used for modifying bitumens such as those mentioned in the Guide Technique written by L'Association Internationale de la Route (AIPCR) and edited by Le Laboratoire Central des Ponts et Chaussées "Use of Modified Bituminous Binders, Special Bitumens and Bitumens with Additives in Road Pavements" (Paris, LCPC, 1999), as well as any mixture in any proportion of these polymers.

In the case of recovery polymer, in particular waste polymer, it could be added in practice upon coating, for example with the solid mineral fraction.

When a polymer is present, the content of polymer in the binder advantageously ranges from 2% to 20% by weight, more advantageously from 2% to 10% by weight, still more advantageously from 4% to 8% by weight, with respect to the total weight of the binder.

In the asphalt mix 4 according to the invention, the content of binder advantageously ranges from 3.1% to 10% by weight, with respect to the total mass of the asphalt mix, more advantageously from 4.5% to 10% by weight, more advantageously from 4.5% to 8.5%.

In a first embodiment, the asphalt mix 4 is a cold casted bituminous material (CCBM).

According to the NF EN 12273 standard (October 2008), a cold casted bituminous material is a surface coating consisting of a mixture of granulates, water, bitumen emulsion and additives prepared and applied on site (upon advancement).

In the case of the production of cold casted bituminous materials (CCBM) 4, the hydrocarbon binder will be advantageously in the form of a cationic emulsion.

The bitumen cationic emulsion is advantageously obtained by mixing, by weight with respect to the total weight of the emulsion:

from 50% to 75% of a hydrocarbon, advantageously bituminous binder, from 25% to 50% of an aqueous phase containing:

i. from 0.1% to 2%, by weight with respect to the total weight of the emulsion, of an emulsifying composition, ii. a sufficient amount of an acid to adjust the pH of the aqueous phase to a value between 1.5 and 8, iii. and water for the formula to make up to 100%.

The pH of the aqueous phase more advantageously ranges from 1.5 and 7, more advantageously from 1.5 and 5.5, still more advantageously from 2 and 3.5.

In the emulsion, the binder content advantageously ranges from 50% to 75% by weight of binder, with respect to the total weight of the emulsion, more advantageously from 60% to 70% by weight.

For example for a CCBM 4, the binder is advantageously a binder having a penetrability measured according to the EN1426 standard (June 2007) between 50 and 220, more advantageously between 70 and 100.

The binder can further comprise a fatty acid dope.

The fatty acid dope can be any fatty acid and derivatives thereof, in particular fatty diacids, fatty triacids, fatty acid dimers or fatty acid trimers, suitable for use in a bituminous material.

For example, the fatty acid is chosen from the group consisting of oleic acid, linoleic acid, and mixtures thereof. These fatty acids advantageously come from vegetable oil(s) or industry waste oils.

The content of fatty acid dope advantageously ranges from 0.3% to 2% by weight, with respect to the weight of the binder, more advantageously from 0.5% to 1% by weight.

The bitumen emulsion is a water dispersion of the binder, water being the continuous phase of the system. It comprises an emulsifying composition.

The content of emulsifying composition advantageously ranges from 0.1% to 2% by weight, with respect to the total weight of the emulsion, more advantageously from 0.13% to 1.2% by weight. The content of emulsifying composition advantageously ranges from 1 kg to 20 kg per ton of emulsion, more advantageously from 1.3 kg to 12 kg per ton of emulsion.

From the relevant surfactants for this application, the following commercial products can be mentioned:
- Dinoram®S (Ceca) or Redicote®E9 (Akzo Nobel): N alkyl tallow propylene diamine
- Emulsamine®L 60 (Ceca): preparation based on N-(3-dimethylamino)propyl tallol fatty amide (>50%) and Emulsamine®LZ (>25%) with an aromatic hydrocarbon (>1%) and diethanolamine (>1%)
- Polyram®S (Ceca): N-alkyl tallow propylene polyamine with Dinoram®S (<10%), tallow alkyl amines (Noram®S—<5%), tallow nitrile (<10%)
- Stabiram®MS 601 (Ceca): solution of N-alkyl tallow N-dimethyl amino propyl N-trimethyl ammonium dichloride (>50%) in a water/hexylene glycol mixture (glycol>20%) with Dinoram®S (<1%)
- Dinoram®O (Ceca): N-(unsaturated C16 and C18 alkyl) trimethylene diamine (oleic diamine)
- Emulsamine®640 (Ceca): preparation based on tallol fatty amides (>50%), Dinoram®O (>25%) and (Z)-octadec-9-enylamine (>1%)
- Indulin®R 66 (Meadwestvaco): tallol fatty amides: N-[(dimethylamino)-3-propyl]
- Indulin®R 33 (Meadwestvaco): (N-[(dimethylamino)-3-propyl]) tallol fatty amides (75-90%), N-tallow alkyltrimethylenediamine (20-25%)
- Indulin®GE F2 (Meadwestvaco): nonylphenol ethoxylate (25-35%), alkaline lignin (reaction producted with dimethylamine and formaldehyde) (15-20%), N—(C14-18 and unsaturated C16-18 alkyl)-trimethylenediamine (5-10%)
- Indulin®GE F2 (Meadwestvaco): C12-C14 ethoxylated alcohols (2.5-25%), alkalin lignin (reaction producted with dimethylamine and formaldehyde) (10-20%), N—(C14-18 and unsaturated C16-18 alkyl)-trimethylenediamine (1-3%)
- Duomeen®TTM (Akzo Nobel): tallowtrimethylpropylenediamine (90-100%), tallowdimethylamine (5-10%)
- Redicote®404 (Akzo Nobel): tallol, reaction products with tetraethylenepentamine (100%).

One or more of these surfactants could be used, alone or in mixtures thereof.

The emulsifying composition could also comprise a non-ionic emulsifying agent. This agent could be chosen from the family of ethoxylated fatty alcohols, wherein the hydrophobic part of the molecule can be of the nonylphenol-, octylphenol-, cetytic, oleic type . . . , the hydrophilic part consisting of several ethoxy groups.

The aqueous phase of the emulsifying composition also comprises a sufficient amount of a mineral or organic acid (for example: citric acid, acetic acid), advantageously a mineral acid. The acid enables amine functions of the emulsifiers to be ionised to allow their dissolution in water.

The acid content is adjusted to the emulsifyier content (as a function of the nature of the granulates, the application temperature . . . ) to have a pH of the aqueous phase between 1.5 and 8, advantageously between 1.5 and 7, more advantageously between 1.5 and 5.5, furthermore advantageously between 2 and 3.5.

The acid is advantageously hydrochloric acid, phosphoric acid or a polyphosphoric acid. The polyphosphoric acid is a phosphoric acid oligomer comprising molecules according to either of the structural formulae $P_nO_{3n+1}^{(n+2)-}$ in which n is an integer higher than or equal to 1, advantageously 1, 2 or 3, or $P_2O_5.x(O^{2-})$, in which x is between 0 and 1.

Others:

The emulsion could contain synthetic or natural latex. By latex, it is meant a dispersion of polymers (SBS, SB) being cross-linked or not in an aqueous phase. This latex is incorporated in the aqueous phase before emulsification or in line during the manufacture of the emulsion or even after manufacturing the emulsion.

Fluxes of petrol origin or from agro-resources could also be added. These fluxes can be added upon manufacturing the emulsion or upon manufacturing asphalt mixes to the emulsion.

The fluxing agent is advantageously a flux of petrol or petrochemical origin. A petrol flux is a product from crude oil distillation (light fraction(s)), that has possibly undergone an hydrotreating operation. In particular, the fluxing agent is chosen from the group consisting of fluxing agents marketed by Total (Greenflux® 2000®, Greenflux SD) or by Exxon (Varsol®).

The fluxing agent is advantageously a flux of non-fossil natural origin (vegetable or animal origin). A flux of non-fossil natural origin consists of a non-fossil natural oil, derivatives thereof such as fatty acid esters and mixtures thereof. These fluxing agents of non-fossil natural origin are well known to those skilled in the art.

Preferentially, vegetable oils will be used, such as oils from sun flower, rapeseed, peanut, copra, linseed, palm, soya, olive, castor, maize, pumpkin, grape seed, jojoba, sesame, walnut, hazelnut, tung, the tall oil, derivatives thereof, as well as mixtures thereof. A siccative additive, such as manganese octoate, could be added to these oils and derivatives in order to promote oxidation reactions.

A mineral additive can be added to the granular fraction to regulate the pH rise kinetics upon mixing and ensure working time and then ensure emulsion breaking quality and improve adhesivity properties. This additive is generally cement, slaked lime, calcic and/or dolomitic lime milk.

The cold cast bituminous materials 4 are implemented at ambient temperature, that is at a temperature ranging from 15° C. to 40° C.

Thus, they are particularly suitable for pipes 3 more sensitive to temperature.

Generally, for CCBM 4, particle sizes for the granular fraction like 0/D to 0/4, 0/6, 0/6 discontinuous, 0/8, 0/8 discontinuous or 0/10 recomposed are used, with possibly humidification to limit segregation upon transporting. The solid mineral fraction advantageously comprises from 6% to 10% by weight of fines, with respect to the total weight of the mineral fraction.

The solid mineral fraction is mixed with a bitumen emulsion to result in a bituminous road material 4 obtained by coating. The solid mineral fraction advantageously represents from 90% to 97%, more advantageously from 90% to 96%, of the weight of the bituminous material.

By a so-called "cold" process, the granulates are not dried, and are mixed as such, that is with their natural moisture (plus an adjustment of water content if necessary) and at ambient temperature. Depending on weather conditions, on the dryness of the solid mineral fraction, the operator can add extra water to the solid mineral fraction.

Generally, the water total weight content of the solid mineral fraction, consisting of extra water and water naturally present in the solid mineral fraction, ranges, depending on the applications, from 5% to 15%. The percentages are expressed by weight with respect to the total weight of the solid mineral fraction.

The operator can also add a dope (a solution possibly diluted with an emulsifier), which will be mainly used as a set retarder. These emulsifiers can be fatty amines but also quaternary ammoniums.

In a second embodiment, the asphalt mix 4 is a so-called hot or warm asphalt mix.

In this embodiment, the binder is advantageously in liquid form or foam form.

The granulates are heated in so-called "dryer" devices, thus allowing a proper adhesion of the bitumen to the granulate. The binder, such as bitumen, is also heated, at temperatures in order to lower the viscosity thereof and allow a proper coating of the granulates. The asphalt mix thus formed is then applied hot on the roadway and then compacted also hot, the initially high temperature ensuring its workability. The material is then rigidified as it cools down.

Within the scope of the present invention, the working temperature of the asphalt mix is advantageously lower than 140° C., more advantageously lower than 130° C., more advantageously between 60° C. and 120° C., still more advantageously between 90° C. and 120° C.

To lower the working temperature of the asphalt mix 4, a workability additive can be added to the formula upon preparing the asphalt mix 4. Thereby, it is said that such a asphalt mix 4 comprises a workability additive.

This workability additive can be an additive having a melting temperature higher than 60° C. and lower to 130° C. Such an additive has a melting temperature higher than 60° C., advantageously higher than 80° C. Such an additive has a melting temperature lower than 130° C., advantageously lower than 120° C. Such an additive enables the asphalt mix 4 to be provided with workability.

This additive enables the binder viscosity to be reduced to lower the temperature of manufacturing and implementing the asphalt mix 4 while preserving the required mechanical properties, improve workability, improve compactness.

In particular, such an additive is at least one fatty acid triglyceride, said fatty acid being chosen from the group consisting of saturated fatty acids, comprising from 12 to 30 carbon atoms, advantageously from 12 to 20 carbon atoms, and that can be substituted with at least one hydroxyl function or by a C1-C4 alkyl radical. A saturated fatty acid includes no insaturations (carbon-carbon double or triple bond). In particular, the fatty acid is chosen from the group consisting of saturated fatty acids comprising 12 to 30 carbon atoms, possibly substituted with at least one hydroxyl function or with a C1-C4 alkyl radical, in particular the fatty acid is chosen from the group consisting of 12-hydroxy-octadecanoic acid, hexadecanoic acid, octadecanoic acid, 9,10-dihydroxy-octadecanoic acid, icosanoic acid, nonadecanoic acid, and mixtures thereof.

The workability additive is advantageously a fatty acid triglyceride, the fatty acid being advantageously chosen from the group previously defined. In particular, the additive comprises at least one triglyceride a fatty acid molecule of which consists of 12-hydroxy-octadecanoic acid. Such an additive is for example described in application EP 2 062 941.

The additive content will be advantageously between 1% and 6% by weight with respect to the total mass of the binder.

Other workability additives are also known.

As other additive, animal, plant or hydrocarbon origin waxes can also be mentioned, in particular long chain hydrocarbon waxes (more than 30 carbon atoms). In particular, polyethylene based hydrocarbon waxes or also hydrocarbon waxes obtained through the Fischer Tropsch synthesis (such as the Fischer Tropsch wax marketed under the trade name Sasobit® by the Sasol company) can be mentioned, with a molecular weight higher than 400 g/mol and lower than 6 000 g/mol. Such waxes are for example described in U.S. Pat. No. 6,588,974, FR 2 855 523, EP 1 017 760, EP 690 102.

As another additive, a fatty acid derivative chosen from the group consisting of fatty acid diesters, fatty acid ethers, amide waxes, diamide waxes and mixtures thereof can also be introduced.

The binder, according to this alternative, advantageously contains from 1% to 6% by weight of said wax with respect to the total mass of the binder.

As the workability additive, a natural, possibly modified of vegetable origin resin can also be introduced.

Most of the natural or modified natural resins of plant origin have no determined melting point but have a softening zone. The resin advantageously has a softening point lower than 130° C., still more advantageously lower than 120° C. and further advantageously higher than 65° C.

The binder advantageously contains from 1% to 6% by weight of said resin of plant origin with respect to the total mass of the binder.

The resin of plant origin is advantageously chosen from the group consisting of natural or modified natural rosins, rosin esters, rosin soaps, terpenes, tall oil, dammar, accroid resins. The resin of plant origin is more particularly a rosin resin, for example the maleic rosin ester glycerol. The additives described in patents FR 2 945 818, FR 2 965 271 can for example be mentioned.

The additives described in patent EP 2 062 943, FR 2 939 143, FR 2 901 279 can also be mentioned.

The workability additive may not have a melting point/ phase change in the temperature range of interest. For example, a flux, also called a fluxing oil, based on animal and/or vegetable fatty materials (oils and greases) can be introduced. The fluxing oil can be a vegetable oil, a distillation residue of a vegetable oil, one of its derivatives such as its fatty acid part, a mixture of fatty acids, a transesterification product (by a C1-C6 alkanol) such as a methyl ester of the vegetable oil or an alkyd resin derivative of the vegetable oil. The vegetable oil comprises unsaturated fatty chains. Such oils are for example described in patents FR 2 910 477, EP 900 822, FR 2 721 043, FR 2 891 838.

Fluxes such as those described in patents WO 2006/070104, WO 2011/151387 and FR 16/57180 (application not yet published) could also be used.

Additives decreasing the surface tension at the binder/ granulate interface (better wettability) could also be contemplated.

The additives described in patent applications FR 2 883 882, EP 1 716 207, EP 1 915 420 can for example be used.

Superabsorbent polymers, such as those described in application FR 2 950 893, could also be used.

The workable asphalt mixes 4 can also be obtained without adding a workability additive.

Thus, the binder can be expanded as foam by employing water. Water can be residual water from the granulates or additives which is vaporised in contact with the granulates and hot binders to foam the binder without a pressure.

An example of additive is a natural and/or synthetic zeolite, or its amorphous initial synthetic phase, such as described for example in patent application WO 2004/016565.

The zeolite is capable of releasing under the action of heat (that is a temperature higher than 110° C.) water molecules which are located between the courses or the interstices of its crystal lattice. The zeolite used is advantageously an A, P, X and/or Y type synthetic zeolite. Preferably, a granule of A type zeolite, in particular of the structural formula Na12 (AlO2)12(SiO2)12, 27 H2O where Na2O is 18%, Al2O3 is 28%, SiO2 is 33% and H2O is 21% will be used.

The so-called hot or warm asphalt mix 4 is advantageously rutting resistant, more advantageously with a percentage of ruts after 30 000 cycles at 60° C. lower than 7.5%, advantageously lower than 5%.

If need be, to optimise the rutting resistance, a polymer-added binder such as previously described will be advantageously used.

When the asphalt mix 4 comprises a phase change workability additive, this additive will also enable a proper rutting resistance to be ensured.

Polyphosphoric acid can also be added, as for example described in patents WO2007/143016, WO2011/153267, WO2006/119354, FR 2 852 018.

In either of these embodiments, the asphalt mix 4 is suitable for road traffic, including high traffic.

The asphalt mix 4 is advantageously an asphalt mix 4 according to this second embodiment when the jobsites are conducted under ambient conditions defavourable to CCBM 4, for example at an ambient temperature lower than 10° C.

The asphalt mix 4 can also comprise one or more additives. Additives can be added either to the binder, or to the granulate, or the asphalt mix.

The additives can also be used for esthetic purposes, in particular for a colour change of the final road products. Thus, they can be a natural or non-natural pigment, such as iron oxide.

Detailed Description of the Method

One object of the invention is a method for manufacturing a road pavement 2 comprising at least one pipe 3 of a device for a heat exchanger, comprising the following steps of:

a) digging a course 6 of the road pavement to create grooves 1 extending in a same direction without crossing each other, and strips 2 connecting the grooves 1 two by two, the grooves 1 having a width ranging from 0.8d to 2d and a depth ranging from 0.8d to 3d, d being the diameter of the pipes 3 of the device for a heat exchanger; and then b) laying the pipe 3 into the grooves 1 and the strips 2 created in step a) by forming sections connected by bends, the grooves 1 receiving the sections and the strips 2 receiving the bends, the pipe 3 having a crushing strength higher than 3 000N per linear metre of pipe at 100° C.; and then c) filling the empty space left free by the pipe 3 in the grooves 1 with an asphalt mix 4 based on:
  a hydrocarbon binder,
  at least 90% by weight, with respect to the total weight of the asphalt mix, of an aggregate fraction the elements of which have dimensions between 0 mm and 10 mm, said aggregate fraction comprising from 30% to 60% by weight, with respect to the total weight of the aggregate fraction, of elements having dimensions between 0 mm and 2 mm,
said asphalt mix 4 having a working temperature lower than 160° C., d) applying a surface course for a road pavement, in particular a wearing course 5.

In a jobsite, most often, several pipes will be laid. The method according to the invention is thus advantageously a method for manufacturing a road pavement 2 comprising pipes 3 of a device for a heat exchanger. Step b) could thus be repeated several times.

During step a), strips 2 and several grooves 1 are dug into a course 6 of the road pavement, or even, in other words, a course 6 of the roadway.

During step b), the pipe is laid in the troughs of the course 6 created in step a), that is in the grooves 1 and the strips 2 created in step a).

During step c), the volume left free by the pipe 3 in the grooves 1, that is the space between the pipe 3 and the rest of the roadway in the grooves 1, or otherwise stated, the volume of the groove 1 not filled by the pipe, is filled with the asphalt mix 4.

Step a)

The invention is particularly applicable to pipes 3 to be installed close to the surface. Thus, the course 6 dug during step a) is advantageously a surface course, such as for example a binder course. The course 6 dug during step a) can also be the wearing course of the roadway to be renovated, before renovation.

The invention is particularly applicable in the field of roads, wherein the road can be intended to a high traffic. Thus, the course 6 dug during step a) is advantageously a course of bound materials, such as for example a course of bituminous mixes, a course of emulsion bituminous concrete, a concrete course, advantageously a course of bituminous mixes or a course of emulsion bituminous concrete.

The thickness of the coating course 6 for being dug during step a) advantageously ranges from d to 10 cm, with d representing the diameter of the pipes 3. The thickness of the coating course 6 to be dug during step a) advantageously ranges from 3 cm to 6 cm.

During step a), the deviation between two grooves 1 is substantially constant. By substantially constant, it is meant that the deviation between two grooves 1 is identical within 5 cm, advantageously within 3 cm. The deviations between two grooves 1 are generally from 10 cm to 30 cm, advantageously from 20 cm to 30 cm.

The grooves 1 can be curved with a radius of curvature advantageously higher than 1 meter, advantageously higher than 3 meters, up to be linear (infinite radius of curvature).

The depth of the grooves 1 ranges from 0.8d to 3d, advantageously from 0.9d to 2.5d, more advantageously from 1d to 2.5d, with d representing the diameter of the pipes 3.

The width of the grooves 1 ranges from 0.8d to 2.5d, advantageously from 0.9d to 2.5d, more advantageously from 1d to 2.5d, with d representing the diameter of the pipes 3.

Figure 3:
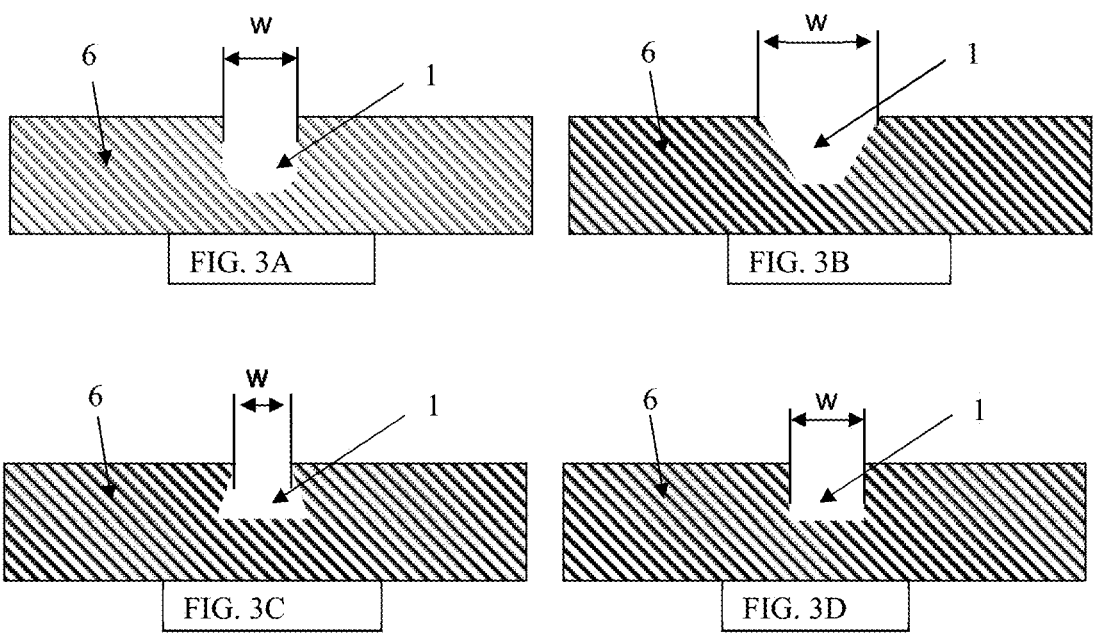
In FIG. 3, different shapes that the groove can assume have been drawn (cross-section view)

The "width" designates the width of the groove 1 measured at the upper surface of the grooved course 6, designated "w" in FIG. 3. Thus, the "width" designates the width of the opening for the groove 1.

The grooves 1 can be in a U, V, dovetail or square shape, as represented in FIG. 3.

By "dovetail", it is intended, for the purposes of the present invention, a regular or non-regular trapezoidal shape in which the long base of the trapezium corresponds to the bottom of the groove 1.

The grooves 1 are longitudinal or transversal to the circulation direction on the roadway.

In the method according to the invention, several grooves 1a, 1b, 1c, 1d, 1e, 1f, and so on, are advantageously dug, which are connected two by two by the strips 2. Thus, the groove 1a is connected to the groove 1b, the groove 1b is connected to the groove 1c, the groove 1c is connected to the groove 1d, the groove 1d is connected to the groove 1e, the groove 1e is connected to the groove 1f, and so on. The grooves 1a, 1b, 1c, 1d, 1e, 1f and so on can be connected by a same strip 2. However, they remain connected two by two. Advantageously, the strips 2 connect more than two grooves 1. In other words, advantageously, the strips 2 connect several grooves 1.

The dimension of the strips 2 is sufficient to receive the bends of the pipe 3. The strips 2 can be in a parallelepiped or crown shape when a grip is made using corers. Advantageously, the strips 2 have a parallelepiped shape.

When the strips 2 have a parallelepiped shape, the width of the strips 2 is advantageously at least 10 cm, more advantageously at least 20 cm, still more advantageously at least 30 cm, for example 35 cm. Here, the width of the strip 2 is the dimension extending in the same direction as the grooves 1.

When the strips 2 have a crown shape, the median diameter of the crown corresponds to the deviation between two grooves 1 and the thickness advantageously ranges from 0.8d to 2.5d.

In either of these shapes, the depth of the strips 2 advantageously ranges from 0.8d to 3d, more advantageously from 0.9d to 2.5d, still more advantageously from 1d to 2.5d, with d representing the diameter of the pipes 3.

Advantageously, the strips 2 in a parallelepiped shape connect more than two grooves 1.

Advantageously, the strips 2 are transversal to the grooves 1.

The grooves 1 are advantageously made by a machining tool. A suitable jobsite machine is preferably a milling machine the drum of which is designed to make a roadway excavation 6 corresponding to the desired layout. This device enables longitudinal or transversal grooves 1 to be made. The thickness of these grooves 1 as well as the deviation between the grooves 1 is defined by the layout and driven by the drum. V, U, dovetail and square shaped preferentially U, grip profiles, are possible depending on the orientation of the teeth. The loop return, that is the 180°-bends of the pipes 3, is ensured by planing a transverse strip 2, in a parallelepiped shape, with a width of at least 20 cm, or by coring a crown shaped strip 2.

This machining can be made by a robot. The robot is equipped with a system enabling the roadway 6 to be excavated. The grooving is made from a digital model defining the robot path to make the desired layout. The robot can be manually driven on site.

Upon renovating an existing roadway:
this step a) can be preceded by a step of planing the pre-existing surface course(s); or
this step a) can be made on the pre-existing wearing course, that is without planing; or
during this step a), planing the pre-existing surface course(s) and digging the grooves 1 can be simultaneously made.

Step b)

Laying the pipes 3 during step b) can be made by any manual or automated means.

Figure 1:
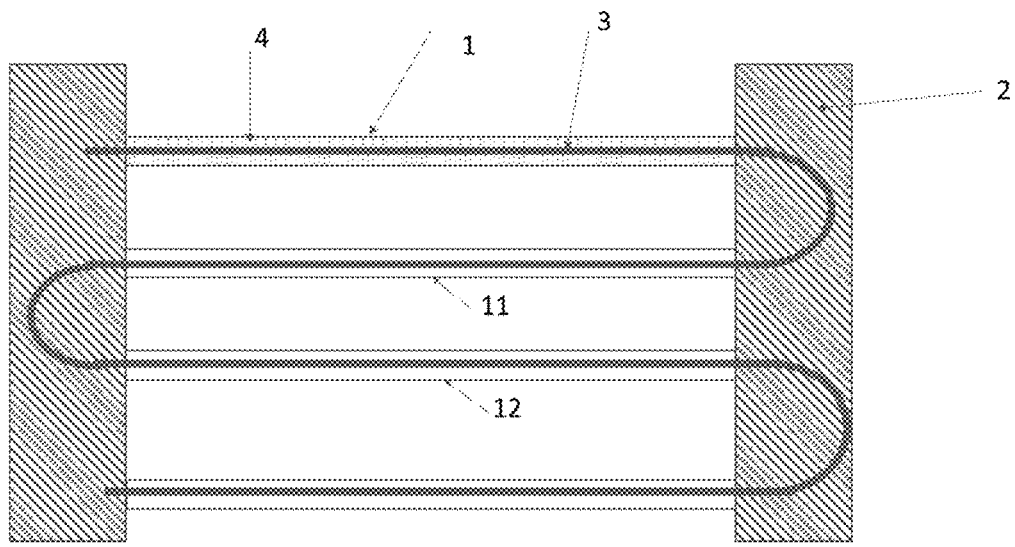
FIG. 1: a top view of the course dug in step b) with grooves receiving the pipe sections and strips receiving the pipe loops. In one of these grooves, the filling with a composition has been represented.

As can be seen in FIG. 1, the bends of the pipe 3 correspond to the zones of the pipe 3 which draw a turn, or even a half-turn, connecting two successive sections of the pipe 3. The sections of the pipe 3 are laid into the grooves 1 and the bends are laid in the strips 2. Advantageously, a same pipe 3 extends in several grooves 1 by passing through at least one strip 2. The pipe 3 is placed into a first groove 11, thus drawing a section and then the pipe 3 leaves the groove 11 and draws a bend in the strip 2 to extend in the second groove 12 and draw a new section, the strip 2 connects the first groove 11 to the second groove 12. Advantageously each section is uninterrupted. Advantageously, each bend is uninterrupted.

The length of the pipe 3 is chosen on a case by case basis, depending on the jobsites. It is most often of at least 30 m, advantageously of at least 50 m.

The pipes 3 are advantageously packaged as a plate or a roll, more advantageously as a roll.

When the pipes 3 used are shape memory pipes, they can be treated in order to erase the shape on a roll stored by the pipe 3. In particular, during step b), the pipes 3 can be heated at temperatures higher than 35° C., in particular ranging from 70° C. to 96° C. or ranging from 35° C. to 55° C., as a function of the nature of the pipe 3, in order to facilitate laying them into the grooves 1. It is in particular implemented when the pipe 3 is of polypropylene, at temperatures higher than 70° C. This heating of the pipes 3 can be made by circulating a hot fluid in the pipes 3.

The pipes 3 can be shaped beforehand to the desired geometry. Thus, the method according to the invention comprises a step in which a geometry is imposed to the pipes 3 of the device for a heat exchanger before the laying step b).

This step can be made previously in a plant or in an edge of lane workshop.

Attachments could be used to maintain the pipes 3 in place in the grooves 1, in particular when the width of the grooves 1 is higher than 1d.

Materials which do not impact the recycling of the road pavement are advantageously used.

The subsequent steps for manufacturing the road pavement can be made directly, without requiring further step(s) for protecting the pipes 3.

During step b), or at any time subsequently, in particular after steps c) and d), the pipes 3 are connected to any suitable thermal system, including a deep geothermal water table, a vertical geothermal probe, a heat pump, . . . .

Tack Coat

In one embodiment, the method comprises after step b), before step c), a step of applying a tack coat.

This tack coat enables binding between the coating courses to be improved and thus courses to be united together. The tack coat is applied as a thin course at the interfaces of the different structures.

To make this tack coat, on the dug course 6 comprising the pipes 3, a possibly fluxed hydrocarbon binder or a bitumen emulsion, advantageously a bitumen emulsion is applied, in particular by spraying. This bitumen emulsion is advantageously an emulsion as previously defined for CCBM.

The tack coat fulfils the specifications of the NF P 98-150-1 standard, of June 2010.

Steps c) and d)

Steps c) and d) can be:
successive: step c) being made before step d), or
concomitant: step c) being made upon applying the road pavement of step d). Indeed, the asphalt mix 4 could be used for making the surface course for a road pavement and fill, when applied, the space between the pipe 3 and the rest of the roadway in the grooves 1, and thus the volume left free by the pipe 3 in the grooves 1. In such a case, step c) is not an individual step but it is implemented concomitantly to the application of the surface course for road pavement during step d).

The thickness of the course applied during step c), or during step c) and d) when both steps are concomitant, is advantageously of at least 1 cm, in particular from 1 cm to 10 cm, advantageously from 1 cm to 6 cm.

When steps c) and d) are successive:
the thickness of the course applied during step c) is advantageously from >0 cm to 4 cm, more advantageously from >0 cm to 3 cm. When the asphalt mix 4 is a CCBM, the thickness of the course applied during step c) is advantageously from >0 cm to 1 cm. When the asphalt mix 4 is a so-called hot or warm asphalt mix, the thickness of the course applied during step c), is advantageously from 1 cm to 4 cm, more advantageously from 1 cm to 3 cm, the course applied during step d) is advantageously a wearing course 5. Its thickness could depend on the type of the material and the properties intended. However, to optimise energy efficiencies, its thickness is advantageously lower than or equal to 8 cm, more advantageously lower than or equal to 6 cm, still more advantageously lower than or equal to 4 cm. For example, its thickness can range from 2 cm to 4 cm.

When steps c) and d) are concomitant, the thickness of the course applied during step c) and d), is advantageously from 2 cm to 10 cm, more advantageously from 3 cm to 10 cm, more advantageously from 3 cm to 8 cm, still more advantageously from 3 cm to 6 cm.

In either of these alternatives, after depositing the surface course of step d), it can also be contemplated to deposit a further course.

To optimise energy efficiencies, the course comprising the pipes 3 is close to the surface. In particular, the combined thickness of the course(s) applied above the course of step a) is advantageously lower than 30 cm, more advantageously lower than 10 cm.

For all thicknesses, unless otherwise indicating, it is the thickness after compacting.

When the asphalt mix 4 is a CCBM, steps c) and d) are advantageously successive.

In one embodiment, when the asphalt mix 4 is a so-called warm or hot hydrocarbon asphalt mix, steps c) and d) are successive. In another embodiment, when the asphalt mix 4 is a so-called warm or hot asphalt mix, steps c) and d) are concomitant.

The method can comprise an intermediate step between steps c) and d) comprising depositing a reinforcing material towards cracking.

Such a material comprises for example a synthetic geomaterial, such as a geotextile or a geogrid, consisting of polymer, possibly bitumen, possibly mineral or organic fibres, woven or non woven. The material is preferably permeable to water and bitumen to promote bonding. The fibres can be in particular glass fibres.

The material enables the course structure to be reinforced, and in particular reflection cracks to be limited.

The material advantageously allows simultaneous recycling of asphalt mixes of the courses considered, when the road pavement is removed, for example following a milling operation. In particular, the material does not comprise metal element.

When steps c) and d) are dissociated, the method could comprise an intermediate step of depositing a tack coat onto the course from step c). This tack coat enables tack between the course from step c) and the wearing course or binder course of step d) to be improved. It advantageously fulfils the criteria previously defined for the optional tack coat between steps b) and c). It fulfils in particular the specifications of the NF P 98-150-1 standard, of June 2010.

To avoid the pipes 3 from being damaged during restoration or renewal operations for the surface courses, a coloured course acting as a visual warning can be provided.

The visual warning can be internal to the asphalt mix 4; thereby it is advantageously chosen from:
a colouring pigment, and/or
coloured granulates, which can be advantageously coloured gravels and/or
a binder of a different colour from the binder used in the surface coating of step d);
such that the colour of the internal visual warning is in sharp contrast to the colour of the surface coating.

Advantageously, the asphalt mix 4 is coloured in the mass, that is the coloured pigment or granulates are present throughout the thickness of the course of asphalt mix 4.

Advantageously, the thickness of the coloured course of asphalt mix 4 is at least 1 cm, more advantageously at least 2 cm.

Otherwise, when steps c) and d) are dissociated, the method could comprise an intermediate step of depositing above the course from step c) or the tack coat, if any, a coloured course acting as a visual warning. Indeed, it is also contemplatable to provide an external visual warning by applying on top of the course of asphalt mix 4 a coloured surface course (coloured resin, lime milk, coloured asphalt mix, . . . ). Advantageously, the distance between the top of the pipe 3 and the upper part of the coloured course is at least 1 cm, advantageously at least 2 cm.

When the surface course of step d) is a course of cold cast bituminous material, the method advantageously also comprises applying on this surface course a wearing course, for example a course of bituminous mix or emulsion bituminous concrete.

The road pavement comprises, on top of the course comprising the pipes 3, at least one road pavement course:
i. adapted to traffics, from low traffics to high traffics as a function of the compositions of the courses of the roadway,
ii. which will collect solar energy (in an energy recovery mode) or which will be to rewarm (in an energy return mode).

The roadway could be of a large surface area, which will provide a heat exchanger with large dimensions.

Figure 2:
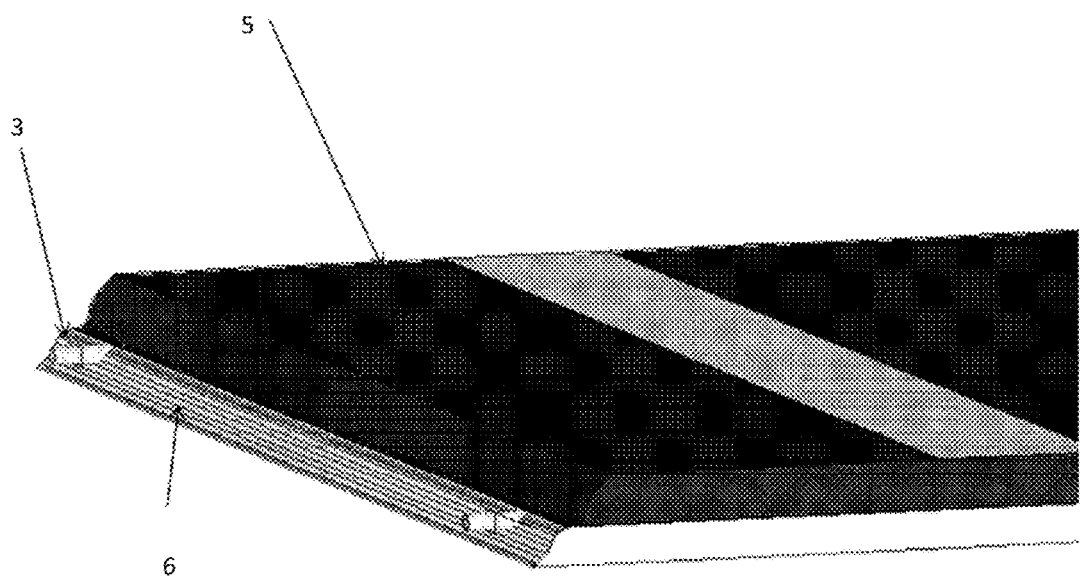
In FIG. 2, the dug course comprising the pipes on which a wearing course is deposited has been represented.

In FIG. 2, the dug course 6 comprising the pipes 3 on which a wearing course 5 is deposited has been represented.

The surface courses of the road pavement make up a heat exchanger operating in heat collection or return, as a function of the weather, of a large surface area.

Prior to step c), during step c), or after step c) but before or during step d), the space between the pipe 3 and the rest of the roadway in the strips 2, that is the volume left free by the pipe 3 in the strips 2, or still in other words, the volume of the strip 2 not filled with the pipe, is also filled. As for step c), the filling can be made directly upon applying the surface course for a road pavement during step d), the material used for this surface course filling the space between the pipe 3 and the rest of the roadway in the strips 2.

The filling material should also enable a proper contact between the pipes 3 and the hardened composition to be ensured while ensuring that the pipes 3 do not rise to the surface. This could be checked by implementing the percolation analysis method by image analysis and the "flotation" test method described as an introduction to the examples.

The asphalt mix 4, previously described, is also suitable and in one embodiment, the filling material filling the space between the pipe 3 and the rest of the roadway in the strips 2, that is the volume left free by the pipe 3 in the strips 2, is the asphalt mix 4 previously described, including the CCBM 4 of the first embodiment or the so-called warm or hot asphalt mix 4 of the other embodiment. Thus, advantageously, the space between the pipe 3 and the rest of the roadway in the strips 2, that is the volume left free by the pipe 3 in the strips 2, is filled with the same asphalt mix 4 of step c).

In zones corresponding to singular points, such as the strips 2 in difficult-to-access zones for machines or strips 2 in binding zones with the technical operation zones, other filling products could also be contemplated, such as in particular:

hydraulic products such as a cement grout, a hydraulic mortar;
a percolated open-graded bituminous mix with a cement grout, in particular SALVIACIM® described in patents FR 1 191 666, FR 1 269 116;
mastic asphalt.

Further, in deep zones, they could be filled with one of these other filling products, in particular SALVIACIM® and with the previously described asphalt mix 4. The filling product closest to the surface will be advantageously the hydrocarbon bituminous mix 4.

In one embodiment, the space, that is the volume left free, is partly or fully filled with a percolated open-graded bituminous mix with a cement grout, in particular SALVIACIM®.

By "open-graded asphalt mixes", it is meant here asphalt mixes which remain permeable after the cooling thereof because of the presence of spaces (porosity) which continue to ensure passage between mineral solid fractions coated with the bituminous binder. This porosity of the open-graded asphalt mixes is defined by a content of empty spaces, after implementation and cooling, between 15% and 50% of empty spaces.

These empty spaces can be filled with a cement grout. The cement grout is advantageously ready-to-use fluidic cement grout. It advantageously comprises cement, sand and a siliceous filler.

In an advantageous alternative of the invention, steps c) and d) are concomitant and during step d), the asphalt mix 4 will fill the space between the pipe 3 and the rest of the roadway in the grooves 1 and the space between the pipe 3 and the rest of the roadway in the strips 2, and thus will fill the volume left free by the pipe 3 in the grooves 1 and in the strips 2. After depositing this surface course, it can also be contemplated to deposit a further course.

Advantageously, in any of the embodiments described previously, the working temperature of the filling material for the strips 2 is lower than 165° C., advantageously lower than 140° C., more advantageously lower than 130° C.

The method of the invention can be implemented upon manufacturing a new roadway or upon renovating an existing roadway.

Upon renovation, the method possibly comprises a step during which the upper courses of the roadway to be renewed are planed up to reach a coating course 6, advantageously a binder course 6, for being dug during step a).

As previously explained, this optional step can precede step a).

Alternatively, the machines used in step a) to create the grooves 1 can also, during the same passage, plane the courses in need thereof.

For some applications, such as roadway snow removal, it is attempted to orient at most the energy transported by the coolant, circulating in the pipes 3, to the surface. The insulating course enables any heat loss elsewhere than to the surface to be minimised.

Complementarily, the road pavement according to the invention can comprise, below the course 6 comprising the pipes 3, a course of insulating materials.

These insulating materials can for example be a course of asphalt mixes comprising the light granulates described in application EP 3 083 521, a thermal insulation of cellular glass which is in the form of plates with a 60 cm×45 cm or 120 cm×60 cm format, and comprised of rigid hermetically closed glass bubbles marketed as FOAMGLAS®, polystyrene, . . . .

Advantageously, the thermal conductivity, λ, of the course of insulating materials is lower than 1 W/m·K.

This course of insulation materials can also act as a base course.

The pavement can also comprise an adhesion course improving the adhesion between the insulating course and the course 6 comprising the pipes 3. It fulfils the specifications of the NF P 98-150-1 standard, of June 2010.

Alternatively, the course 6 dug of step a) can be an insulating course. It is then a course of asphalt mixes comprising the light granulates described in application EP 3 083 521.

EXAMPLES

The asphalt mix 4 enables a proper contact between the pipes 3 and the hardened composition 4 to be ensured while ensuring that the pipes 3 do not rise to the surface.

The proper contact between the pipes 3 and the hardened composition 4 can be checked by a percolation analysis method by image analysis.

In particular, the test protocol can be used:
cutting off in the direction transverse to the pipe 3
shooting with a Nikon 300 type camera, objective lens 18-200
resolution: 12 Mpixels
photograph encompassing at least the entire groove and a circle having as a centre the centre of the circle drawn by the pipe 3 and with a diameter D higher than or equal to 3d, d being the diameter of the pipe 3
natural lighting photograph
visual analysis of the photographs to detect non-percolated zones on the surface analysed: manual reading of the surfaces
recommendation: the detected non-percolated surface/analysed surface (3d) ratio should be lower than 5%, preferably 2%, preferably 1%. The term "analysed surface (3d)" means that the analysed surface corresponds to a circle having as a centre the centre of the circle drawn by the pipe 3 and with a diameter D higher than or equal to 3d, d being the diameter of the pipe 3.

The fact that the composition enables to ensure that the pipes 3 do not rise to the surface can be checked by the following "Flotation" test method:
a pipe 3 of the diameter d, expressed in mm, is laid in rectangular shaped reserves having the following dimensions:
depth d+1 cm
width d+1 cm
length: 50 cm
the composition is implemented according to the working conditions recommended for said composition, at the temperature which will be its implementing temperature.

the sample is preserved 7 days at 20° C.+3° C., atmospheric pressure, and then cut off in the direction transverse to the pipe 3 and the distance separating the bottom from the reserves of the pipe 3 is measured. The composition is compliant if this distance is strictly lower than 1 cm.

In the examples that follow, for all thicknesses, unless otherwise indicated, it is the thickness after compacting.

Example 1: Jobsite Tests

Principle: making grooving of the binder course 6 via a specific milling machine and then laying the pipes 3 of the exchanger before implementing the wearing course 5.

Description of the Samples

Pipes 3

Three types of pipes 3 are evaluated on the test bench.

(1) Pipe of anti-oxygen barrier cross-linked polyethylene manufactured by REHAU in two definitions: diameter 20 mm×1.9 mm and diameter 20×2.9 mm (external diameter× skin thickness), length 100 m. The expansion coefficient of this pipe 3 is $140.10^{-6}$ m/mK at 20° C. The hot shrinkage, measured according to the NF EN ISO 2505 standard of September 2005, is lower than 3% (in stove, at 150° C. for 60 mn). The crushing strength measured at 100° C. is 3 000N per linear meter of pipe.

(2) Pipe of polypropylene manufactured by MULTIBETON 17 mm×2.2 mm (external diameter×skin thickness), length 100 m. The expansion coefficient of this pipe 3 is $160·10^{-6}$ m/mK at 23° C. The hot shrinkage, measured according to the NF EN ISO 2505 standard of September 2005, is lower than 2% (in stove, at 150° C. for 60 mn). The crushing strength measured at 100° C. is 4 500N per linear meter of pipe.

(3) Pipe of polybutene of diameter 16×3 mm (external diameter×skin thickness), length 20 m, thermal expansion coefficient: $130·10^{-6}$ m/m·K, heat conductibility: 0.24 W/m·K. The crushing strength measured at 100° C. is 4 500N per linear meter of pipe marketed by Prolians (Bernard Pages).

Maintaining the Pipes 3

The pipes 3 can be attached with plastic clips:

(4) pin collar clips, RAMClip (RAM), (roadway piercing in Ø 8 mm on either side of the groove 1, and then fitting the clips to attach the pipes 3).

Asphalt Mix 4

A hot asphalt mix 4 has been tested. The formula of the hot asphalt mix 4 (BMME 0/10) is given in the following table:

TABLE 1

| | % by weight with respect to the total weight |
|---|---|
| 6/10 Thiviers | 55.3% |
| 0/2 Thiviers | 37.9% |
| Fines | 1.6% |
| Extra binder 35/50 | 4.8% |
| Sasobit ® | 0.4% |

SASOBIT®, marketed by Sasol, is an additive enabling the workability of the formula of asphalt mixes to be improved and the manufacture temperature of the asphalt mixes to be lowered. The manufacture temperature is 140° C.

Test Protocol

The course 6 of step a) is a binder course having the following formula:

TABLE 2

| Component | % by weight with respect to the total weight |
|---|---|
| 2/6 SGC | 50.5% |
| 0/2 SGC | 40.6% |
| Fines | 3.5% |
| Extra binder 35/50 | 5.4% |

Grooves 1 and strips 2 are made in this binder course 6 using a roadway milling machine:

in a first time, grooves 1 with dimensions close to the size of the pipes 3 (external diameter of the pipes: 17 to 22 mm) are made.

The grooves 1 have been made in the existing course 6 on the test bench with a drum equipped with 3 rows of teeth spaced by 26 cm enabling grips of a 3.5 cm depth to be made.

In a second time, the side strips 2 with a width 35 cm (width of the smallest drum of the milling machine) to accommodate the loops of the pipes 3 of the exchanger are made.

Two test zones have been machined with this specific milling machine:

in zone 1, longitudinal grooves 1 (in the circulation direction of the finisher) have been milled in 6 passes (that is 18 grooves 1 with a length of about 15 m)

in zone 2, a transverse grooving has been made (51 grooves 1 with the length of about 4 m).

TABLE 3

| Zone 1: longitudinal grooving Longitudinal mode | |
|---|---|
| Surface area treated | 70 m² |
| Number of grooves 1 | 18 |
| Length of the grooves 1 | 15 m |
| Working duration | 12 mn |

Observations:

The positioning of the milling machine between each pass has been made via marks on the machine in order to ensure a constant gap between the grooves.

Once this first adjustment has been made, no particular difficulty has been noted.

TABLE 4

| zone 2: transverse grooving Transverse mode | |
|---|---|
| Surface treated | 50 m² |
| Number of grooves 1 | 51 |
| Length of the grooves 1 | 4.5 m |
| Working duration | 17 mn |

Observations:

The transverse mode is longer to implement because more passes of the milling machine are needed to treat the same surface area (higher number of adjustments).

Samples have been taken as plates (thickness about 5 cm, width 18 cm, length 50 cm) of this binder course 6. In the laboratory, the pipe 3 has been fit into the groove 1, the hot asphalt mix 4 (BBME 0/10) has been applied at 140° C. in order to make thereafter rutting tests according to the protocol described in the NF EN 12967-22 standard (September 2007).

The results are given in the following table:

TABLE 5

| Description of the complex | Rutting result: 30 000 cycles |
|---|---|
| Sample of zone 1 | 7% |
| Sample of zone 2B | 5.9% |

The complexes have a satisfactory rutting resistance.

Implementing the Pipes 3 on Jobsite

The pipes 3 have been implemented hot in the grooves 1. This type of implementation enables the flexibility of the pipes 3 to be improved:

for pipes of polypropylene, this type of implementation is systematic to heat form the pipe and modify its shape memory and limit tensions and torsions on the material. The pipe is heated at temperatures higher than 70° C. (herein about 90° C.)

for the other pipes of polyethylene and polybutene, the laying while hot has also been implemented to facilitate their fitting in the grooves 1; however, the temperatures have been limited to 40-50° C. The laying while hot for this type of pipe is not mandatory.

The pipes 3 are laid into the grooves 1, half-turns being made in the strips 2. Thus, 50 m of pipe 3 are fitted.

Tack Coat

On the course 6 comprising the pipes 3, a tack coat is applied at 250 g of residual binder per m², by spraying a bitumen cationic emulsion of the following formula:

TABLE 6

| Component | Proportion kg/t of emulsion |
|---|---|
| Bitumen 70/100 Total | 650 kg/t |
| Aqueous phase | |
| Dinoram ®S | 1.5 kg/t |
| HCl | 1.4 kg/t |
| Water | Qsf for 1 t that is about 350 kg/t |

Qsf = quantity sufficient for

Filling and Implementation of the Wearing Course (Steps c) and d))

The grooves 1 have been filled with the previously described asphalt mix 4 simultaneously to the application of the asphalt mix 4 to make the coating course. The previously described basphalt mix 4 BBME 0/10 enables the pipes 3 to be sealed while closing the grooves 1 and the strips 2 and ensuring the properties of a wearing course. The asphalt mix 4 enables the grooves 1 and the side strips 2 to be simultaneously filled.

Two implementations have been tested:

the course of asphalt mix 4 BBME 0/10 is implemented in 1 pass of finisher; this course enables the grooves 1 and the strips 2 to be filled and a course of 5 cm thickness to be obtained. This course can directly be used as a wearing course 5.

The course of asphalt mix 4 BBME 0/10 of 5 cm is implemented in 2 passes of finisher; the first course, with a small thickness in the order of 1.5 cm-3 cm enables the grooves 1 and the strips 2 to be filled whereas the second course is strictly speaking the wearing course 5.

Results:

Zone 1: longitudinal grooves 1/implementation of the wearing course 5 in one pass of finisher.

The wearing course 5 is implemented in one pass.

Observations:

Throughout the zone, viewing the traces of the grooves 1 at a surface (whatever the pipe).

Zone 2A: transverse grooves 2/implementation of the wearing course 5 in two passes of finisher After observing the phenomenon of viewing the traces of the grooves 1, the wearing course 5 has been implemented in two passes of finisher with compacting between both passes.

Observations:

No particular observation: good behaviour of the pipes 3 (zone with pipes of PP), no transparency viewing phenomenon.

Zone 2B: transverse grooves 1/implementation of the wearing course 5 in one pass of finisher Observations:

In the zone, viewing the traces of the grooves 1 at the surface (pipes of PER or PB).

Visually, less pronounced than for the longitudinal grooves 1.

The asphalt mix 4 BBME could be replaced by a CCBM 4 having the formula given in the following table:

TABLE 7

| | % by weight with respect to the total weight of the granular fraction |
|---|---|
| Passing through 6.3 mm | 100% |
| Passing through 2 mm | 57% |
| Passing through 0.063 mm | 7.6% |
| | Part percent (ppc) by weight with respect to the total weight of the granular fraction |
| Cement | 1 ppc |
| Wetting water | 8.7 ppc |
| 60% emulsion (surfactant: Stabiram ® MS 601) | 13.5 ppc |
| (residual binder) | (8.1 ppc) |

Comparative Example 1: Tests in Laboratory

In this example, different filling materials have been tested in the laboratory:

a hot asphalt mix 4 (BBME 0/10) as defined in table 1 a commercial jointing mortar, Tradi-Pav Joint® comprised of special cements, non-reactive granulates 0/2, fibres and adjuvants two cement mortars having the formulae given in the following table.

The Tradi-Pav Joint® mortar is prepared by mixing 25 kg of product in 3.5 L, according to the manufacturer recommendations.

In a rutting plate, rectangular shaped reserve having the following dimensions have been made:

Depth d+1 cm

Width d+1 cm

Length: 50 cm.

The pipe 3 of polypropylene (having the characteristics given in example 1) has been laid into these reserves and then the mortar has been added according to its recommended working conditions.

The placement of the mortar lifts the pipe 3 which floats in the reserves.

The cement mortars have been prepared according to the following formulae, the amounts are expressed as kg per 1 m$^3$:

TABLE 8

| Formulae | M1 | M2 |
| --- | --- | --- |
| 0/2 luché | 1920 | — |
| 0/4 Dompierre | — | 1920 |
| Cement CEM II 32, 5 R | 400 | 400 |
| Superplastifier[1] | 18.6 | 18.6 |
| water | 200 | 180 |
| Water/cement ratio | 0.5 | 0.45 |

[1]MasterGlenium ACE 500 marketed by BASF

The kneading time was 4 min.

The pipe 3 of polypropylene (having the characteristics given in example 1) has been put in a container and the mortar has been added in its usual working conditions.

With mortar M1, the pipe 3 remains visible: there is a filling deficiency about the pipe 3 and empty spaces at the pipe/mortar interface.

With mortar M2, the pipe 3 is not visible but a significant bleeding and the presence of empty space within the mortar are observed.

In a rutting plate, rectangular shaped reserves having the following dimensions are made:

Depth d+1 cm
Width d+1 cm
Length: 50 cm.

The pipe 3 of polypropylene (having the characteristics given in example 1) has been laid into these reserves and then the asphalt mix 4 BBME 0/10 has been added at an implementing temperature of 140° C.

No rising or flotation of the pipe 3 is observed.

The pipe 3 is perfectly coated. The proper contact between the pipes 3 and the hardened asphalt mix 4 is checked by a percolation analysis method by image analysis, according to the following test protocol:

cutting off in the direction transverse to the pipe 3
shooting with a Nikon 300 type camera, objective lens 18-200
resolution: 12 Mpixels
photograph encompassing at least the entire groove and a circle having as a centre the centre of the circle drawn by the pipe 3 and with a diameter D higher than or equal to 3d, d being the diameter of the pipe 3
natural lighting photograph
visual analysis of the photographs to detect the non-percolated zones on the surface analysed: manual reading of the surfaces The detected non-percolated surface/analysed surface (3 d) ratio is lower than 1%.

The term "analysed surface (3 d)" means that the analysed surface corresponds to a circle having as a centre the centre of the circle drawn by the pipe 3 and with a diameter D higher than or equal to 3d, d being the diameter of the pipe 3.

The invention claimed is:

1. A method for manufacturing a road pavement comprising at least one pipe of a device for a heat exchanger, comprising the following steps of:

a) digging a course of the road pavement and creating grooves extending in a same direction without crossing each other, and strips connecting the grooves two by two,
wherein the grooves have a width ranging from 0.8d to 2.5d and a depth ranging from 0.8d to 3d, d is the diameter of the pipes of the device for a heat exchanger; and then b) laying the pipe into the grooves and the strips created in step a), comprising forming sections connected by bends,
wherein the grooves receive the sections and the strips receive the bends, and
wherein the pipe has a crushing strength higher than 2 000N per linear metre of pipe at 100° C.; and then c) filling the empty space left free by the pipe in the grooves with an asphalt mix based on:
a hydrocarbon binder,
at least 90% by weight, with respect to the total weight of the asphalt mix, of an aggregate fraction the elements of which have dimensions between 0 mm and 10 mm,
wherein said aggregate fraction comprising from 30% to 60% by weight, with respect to the total weight of the aggregate fraction, of elements having dimensions between 0 mm and 2 mm, and
wherein said asphalt mix has a working temperature lower than 160° C., d) applying a surface course for a road pavement.

2. The method of claim 1, characterised in that the pipe has a crushing strength higher than 3 000N per linear metre of pipe at 100° C.

3. The method of claim 1, wherein the pipe has a thermal expansion lower than $200.10^{-6} K^{-1}$ at 20° C.

4. The method of claim 1, wherein the aggregate fraction comprises, in weight with respect to the total weight of the aggregate fraction:
from 6% to 9% of fines, having a size lower than 0.063 mm;
from 24% to 38% of sand, having a size between 0.063 mm and 2 mm;
from 40% to 65% of aggregates, having a size between 2 mm and 10 mm.

5. The method of claim 1, wherein the asphalt mix is a cold cast bituminous material.

6. The method of claim 1, wherein the course dug in step a) is a surface course.

7. The method of claim 1, wherein the thickness of the course of the road pavement for being dug in step a) ranges from d to 10 cm, with d representing the diameter of the pipes.

8. The method of claim 1, wherein the width of the strips is at least 20 cm.

9. The method of claim 1, wherein the strips connect more than two grooves.

10. The method of claim 1, wherein the deviation between two grooves is substantially constant.

11. The method of claim 1, wherein the device for a heat exchanger in said course of the road pavement does not comprise a metal element.

12. The method of claim 1, wherein said method comprises, after step b) and prior to step c), laying a tack coat.

13. The method of claim 1, wherein steps c) and d) are concomitant.

14. The method of claim 1, wherein steps c) and d) are successive.

15. The method of claim 1, wherein said method comprises filling the volume left free by the pipe in the strips with the same asphalt mix of step c).

16. The method of claim 1, wherein the combined thickness of the course(s) applied during steps c) and d) is lower than 30 cm.

17. The method of claim 1, wherein the pipe is of polymer.

18. The method of claim 17, wherein the polymer is chosen from cross-linked high-density polyethylene, polypropylene, polybutene and ethylene-propylene block copolymers.

19. The method of claim 1, wherein the asphalt mix is a hot or warm asphalt mix.

20. The method of claim 19, wherein the asphalt mix comprises a workability additive.

* * * * *